United States Patent [19]
Carr et al.

[11] 3,835,132
[45] Sept. 10, 1974

[54] MORPHOLINO-PIPERAZINYL PYRIMIDINES

[75] Inventors: John B. Carr; George R. Haynes; James R. Albert, all of Modesto; K. Kodama, Alamo, all of Calif.

[73] Assignee: Shell Oil Company, Houston, Tex.

[22] Filed: Sept. 21, 1973

[21] Appl. No.: 399,783

Related U.S. Application Data

[63] Continuation-in-part of Ser. No. 111,635, Feb. 1, 1972, abandoned.

[52] U.S. Cl. ............................ 260/247.5 D, 424/248
[51] Int. Cl. ............................................ C07d 87/40
[58] Field of Search ............................ 260/247.5 D

[56] References Cited
UNITED STATES PATENTS
3,707,560  12/1972  De Angelis ............... 260/247.5 D OTHER PUBLICATIONS
Sokolova et al. Chem. Abstracts Vol. 69 (1968) 96,644 m

*Primary Examiner*—Lorraine A. Weinberger
*Assistant Examiner*—Richard D. Kelly

[57] ABSTRACT

2-morpholino-4-(ethylamino)-6-(1-piperazinyl) pyrimidine and its dihydro(middle halide) salts, useful as anti-inflammatory agents.

3 Claims, No Drawings

MORPHOLINO-PIPERAZINYL PYRIMIDINES

CROSS-REFERENCE TO RELATED APPLICATION

This application is a continuation-in-part of our co-pending application, Ser. No. 111,635, filed Feb. 1, 1971, now abandoned.

DESCRIPTION OF THE INVENTION

This invention consists of the novel compounds 2-morpholino-4-(ethylamino)-6-(1-piperazinyl)pyrimidine and its dihydro (middle halide) salts, their use as anti-inflammatory agents and anti-inflammatory compositions containing at least one of them as an anti-inflammatory agent. As used herein, the term "dihydro (middle halide)" denotes the dihydrochloride and dihydrobromide salts. Included are the hydrates.

These compounds have been found to exhibit substantial anti-inflammatory action in warm-blooded animals under standard and accepted pharmacological procedures in animals, while being essentially non-toxic to the test animals at pharmacologically effective dosages.

The compounds of the invention being solids at ambient temperatures may be formulated for use as anti-inflammatory agents as suppositories, aqueous suspensions, tablets or hypodermic solutions using compounding techniques and adjuvants which are known to those skilled in the art. For example, for use as suppositories 0.1–10 percent of active ingredient may be dispersed in a conventional suppository base, such as cocoa butter; aqueous suspensions may be prepared by dispersing 0.1–10 percent active ingredient in an aqueous base containing conventional pharmacologically acceptable dispersants and surfactants; tablets may be prepared by compounding 1–50 percent of active ingredient with conventional fillers, such as lactose and/or corn starch and other additives (such as, stabilizers, slow release modifiers and binding agents); hypodermic solutions may be prepared from distilled water containing the appropriate adjuvants, with the concentration of the active ingredient being 0.1–5 percent.

The effective quantity, or dosage, of the active material can vary over wide limits, depending upon the animal in question, the technique of administration and other factors well-known to practitioners of the art. For oral or parenteral administration in some cases, as little as 0.01 milligram of the active material per kilogram of body weight can be effective in the reduction of inflammation, while seldom will a dosage in excess of about 500 milligrams per kilogram of body weight be required. In general, for oral administration, the effective dosage will be from about 1.0 to 200 milligrams per kilogram of body weight, while for parenteral administration, the effective dosage will be from about 0.10 to about 100 milligrams per kilogram of body weight.

The compounds of this invention can be prepared as described in the following examples, in which parts by weight (w) and parts by volume (v) bear the same relationship as does the kilogram to the liter, and all temperatures are in degrees Centigrade.

EXAMPLE I 2-morpholino-4-(ethylamino)-6-(1-piperazinyl)-pyrimidine dihydrochloride dihydrate

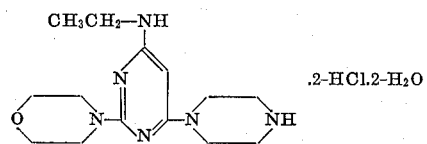

Morpholine (112 w) in a solution of ethanol (100 v) was added dropwise to a stirred solution of 2,4,6-trichloropyrimidine (117 w) in ethanol (200 v). During the addition, the temperature of the reaction mixture was controlled below 30° by external cooling to avoid substitution of an second chlorine. After the addition was complete, the reaction mixture was stirred at ambient temperatures for 15 hours. The resulting white crystalline suspension was slurried with water, filtered and dried. Thin layer chromatography on silica gel, using ether as the developing solvent, indicated the dried crystalline product to be a mixture of two components. Elution chromatography of the dried product through a silica gel column using ether as the eluent yielded, after recrystallization from ether, 2,6-dichloro-4-morpholino-pyrimidine (103.9 w), m.p. 119.5°–121°, and 4,6-dichloro-2-morpholinopyrimidine (29.6 w), m.p. 137–137.5, both as white crystalline solids.

4,6-dichloro-2-morpholinopyrimidine (46 w) was charged into a flask containing 70 percent aqueous ethylamine (125 w) and n-propanol (600 v). The resulting solution was refluxed (100°) for 5½ hours. Upon completion of the reflux period, the solvent volume was reduced in a rotary evaporator, the concentrated reaction mixture was poured into water and the product was extracted with methylene chloride. The combined extracts were dried with anhydrous magnesium sulfate and the solvent was removed by distillation in a vacuum to give a crystalline product. This product was purified by elution chromatography on a silica-gel G column, using ether as the eluent to yield after recrystallization from methylene chloride-ether, a white crystalline solid, 6-chloro-4-(ethylamino)-2-morpholinopyrimidine (42.8 w), m.p. 127.5°–129.5°.

6-chloro-4-(ethylamino)-2-morpholinopyrimidine (10 w) and piperazine (35.4 w) in dimethylacetamide solution were refluxed at 165° for 4 hours. Upon completion of the reflux period, the reaction product was cooled, poured into water, made basic with 5 percent sodium hydroxide and extracted with methylene chloride (3x). The combined extracts were washed with water and dried with anhydrous magnesium sulfate, and the solvent was removed by distillation in a vacuum. The residue obtained in this manner was dissolved in benzene and hydrogen chloride gas was bubbled into the benzene solution to yield a product having a gummy consistency. The benzene was decanted and the gum was recrystallized from ethanolhexane to yield 4-(ethylamino)-2-morpholino-6-(1-piperazinyl) pyrimidine dihydrochloride dihydrate (9.9 w), m.p. 294°–295°. The structure was confirmed by elemental analysis.

| | Analysis (Percent by Weight) | |
|---|---|---|
| Calculated: | N 20.9; | Cl 17.7 |
| Found: | N 20.6; | Cl 17.3 |

EXAMPLE II 2-morpholino-4-(ethylamino)-6-(1-piperazinyl)pyrimidine

The free base, mentioned above, was obtained by treating the salt (Example I) with 15% aqueous sodium bicarbonate. The resulting mixture was extracted with methylene chloride, and the solvent was evaporated from the extract to give 2.6 grams of the free base, as a gum which solidified on standing, melting point: 102°–105°. Its identity was confirmed by elemental analysis.

Analysis
(Percent by Weight)

| | | | |
|---|---|---|---|
| Calculated: | C 57.5; | H 8.2; | N 28.7 |
| Found: | C 57.1; | H 8.4; | N 28.5 |

EXAMPLE III

Anti-inflammatory tests of the compounds of the present invention were carried out on rats using the carrageenin-induced foot edema test of Charles A. Winter, et al., Carrageenin-Induced Edema in Hind Paw of the Rat as an Assay for Anti-Inflammatory Drugs, Proceedings of the Society for Experimental Biology and Medicine, 111, 544 (1962). Each of the compounds under test was given orally to a test group of 10 rats at a dosage of 32 mg/kg, and one hour later carrageenin was injected subcutaneously into one paw of each of the test rats. Three hours later the degree of edema was measured volumetrically by fluid displacement or by weight of amputated paw and compared to that of the control paw. The results of one series of the tests presented in terms of percentage inhibition of edema is given in Table I. The results of a second series of tests are given on the same basis in Table II.

TABLE I

| Compound Under Test | Percent Inhibition of Edema |
|---|---|
| 2-morpholino-4-(ethylamino)-6-(1-piperazinyl)pyrimidine dihydrochloride dihydrate | 33 |

TABLE II

| Compound Under Test | Percent Inhibition of Edema |
|---|---|
| 2-morpholino-4-(ethylamino)-6-(1-piperazinyl)pyrimidine dihydrochloride dihydrate | 42 |
| 2-morpholino-4-(ethylamino)-6-(1-piperazinyl)pyrimidine | 46 |

We claim as our invention:

1. A compound of the formula

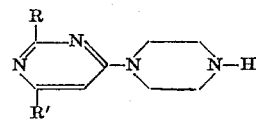

wherein R is morpholino and R′ is ethylamino, and the dihydro (middle halide) salts thereof.

2. The free base according to claim 1.
3. The dihydrochloride salt according to claim 1.

* * * * *